United States Patent
Ichikawa

(10) Patent No.: US 11,449,721 B2
(45) Date of Patent: Sep. 20, 2022

(54) IMAGE FORMING APPARATUS HAVING LIGHT EMISSION CONTROL AND IMAGE FORMING METHOD

(71) Applicant: TOSHIBA TEC KABUSHIKI KAISHA, Tokyo (JP)

(72) Inventor: Masaki Ichikawa, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/388,355

(22) Filed: Jul. 29, 2021

(65) Prior Publication Data

US 2021/0357711 A1 Nov. 18, 2021

Related U.S. Application Data

(63) Continuation of application No. 16/830,107, filed on Mar. 25, 2020, now abandoned.

(51) Int. Cl.
| | |
|---|---|
| *G06K 15/00* | (2006.01) |
| *G06K 15/02* | (2006.01) |
| *G03G 15/043* | (2006.01) |
| *G06K 15/14* | (2006.01) |
| *G03G 15/04* | (2006.01) |

(52) U.S. Cl.
CPC ......... *G06K 15/027* (2013.01); *G03G 15/043* (2013.01); *G03G 15/04054* (2013.01); *G06K 15/14* (2013.01)

(58) Field of Classification Search
CPC combination set(s) only.
See application file for complete search history.

(56) References Cited

U.S. PATENT DOCUMENTS

| | | | |
|---|---|---|---|
| 11,077,690 B2 * | 8/2021 | Muramatsu | B41J 2/2135 |
| 11,126,107 B2 * | 9/2021 | Kuo | G03G 15/043 |
| 2009/0190149 A1 | 7/2009 | Aoki | |
| 2011/0317175 A1 | 12/2011 | Murayama et al. | |
| 2020/0371463 A1 | 11/2020 | Kuo et al. | |

FOREIGN PATENT DOCUMENTS

JP 2017-215416 A 12/2017

OTHER PUBLICATIONS

Non-Final Office Action on U.S. Appl. No. 16/830,107 dated Dec. 9, 2020.
Final Office Action on U.S. Appl. No. 16/830,107 dated Apr. 29, 2021.

* cited by examiner

*Primary Examiner* — Barbara D Reinier
(74) *Attorney, Agent, or Firm* — Foley & Lardner LLP

(57) ABSTRACT

An image forming apparatus includes a plurality of print heads, a sensor, a processor, and an image forming unit. The plurality of print heads are arranged in parallel. The sensor detects a color shift amount of each color to be printed by the plurality of print heads in a main scanning direction based on an output result of a test pattern by the plurality of print heads. The processor sets a color shift correction value for correcting the color shift amount on the basis of a color having a largest color shift amount. The processor controls light emission of the plurality of print heads based on the color shift correction value and image data. The image forming unit forms an image based on the image data on a sheet by light emission of the plurality of print heads.

9 Claims, 5 Drawing Sheets

IMAGE FORMING APPARATUS HAVING LIGHT EMISSION CONTROL AND IMAGE FORMING METHOD

CROSS-REFERENCE TO RELATED APPLICATION

This application is a continuation of U.S. application Ser. No. 16/830,107 filed Mar. 25, 2020, the entire contents of which are incorporated herein by reference.

FIELD

Embodiments described herein relate generally to an image forming apparatus and an image forming method.

BACKGROUND

Electrophotographic printers (hereinafter, printers) equipped with print heads are widely used. For example, the print head includes a plurality of light emitting elements such as a light emitting diode (LED) or an organic light emitting diode (OLED). A photoconductive drum is exposed to the light output from the plurality of light emitting elements, a latent image is formed on the photoconductive drum, and an image corresponding to the latent image is printed on a sheet such as recording paper.

For example, a print head is provided with light emitting elements corresponding to 15,400 pixels, the arrangement of the light emitting elements correspond to a main scanning direction, and the movement of the print head back and forth corresponds to a sub-scanning direction. The print head is mounted on a housing of a printer with high-precision positioning, but may be slightly displaced. The influence of this slight displacement results in the displacement of an image on a sheet in the main scanning direction.

A color printer includes a plurality of print heads arranged in parallel in the main scanning direction, and the plurality of print heads correspond to a plurality of colors. In the color printer, the influence of slight mounting displacement of each print head with respect to the housing of the printer and the influence of relatively slight displacement of each print head result in the displacement of an image on a sheet in the main scanning direction and color shift of each color.

DETAILED DESCRIPTION

Figure 1:
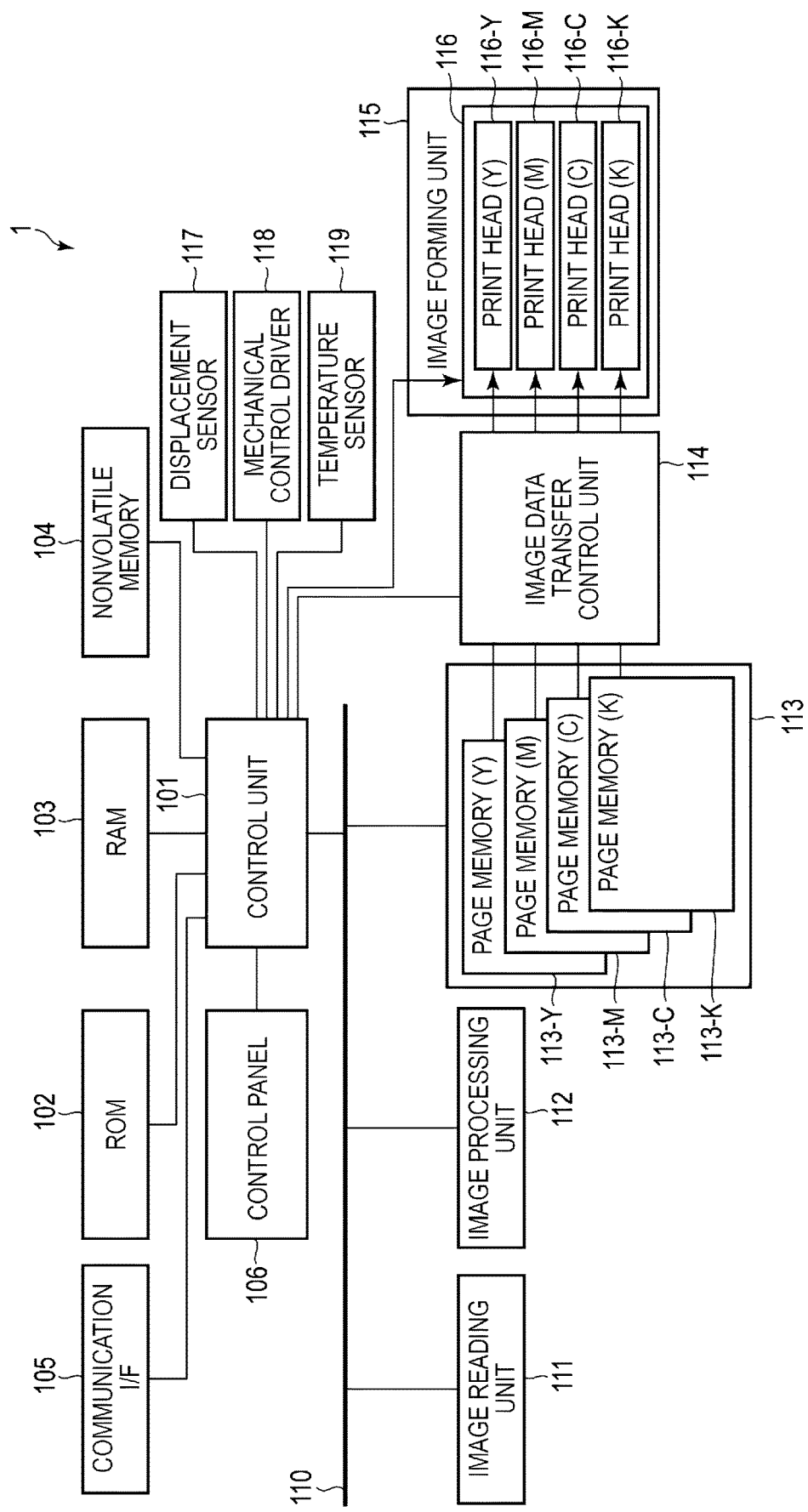
FIG. 1 is a block diagram illustrating an example of a schematic configuration of an image forming apparatus according to an embodiment.

In the embodiments presented herein, it is possible to reduce the effect of the relative displacement of each print head by making the width of each print head employed in a color printer sufficiently long with respect to the sheet width, and by controlling the light emission of a plurality of optical elements included in each print head.

In general, according to one embodiment, an image forming apparatus includes a plurality of print heads, a sensor, a processor, and an image forming unit. The plurality of print heads are arranged in parallel. The sensor detects a color shift amount of each color to be printed by the plurality of print heads in a main scanning direction based on an output result of a test pattern by the plurality of print heads. The processor sets a color shift correction value for correcting the color shift amount on the basis of a color having a largest color shift amount so that an image of each color in the main scanning direction falls within a range of a valid image area commonly covered by the plurality of print heads. The processor controls light emission of the plurality of print heads based on the color shift correction value and image data. The image forming unit forms an image based on the image data on a sheet by the light emission of the plurality of print heads.

Hereinafter, an example of the image forming apparatus according to the embodiment will be described with reference to drawings. In each drawing, the same reference numeral is given to the same configuration.

FIG. 1 is a block diagram illustrating an example of a schematic configuration of the image forming apparatus according to the embodiment.

For example, an image forming apparatus 1 is a multi-function peripheral (MFP). As illustrated in FIG. 1, the image forming apparatus 1 includes a control unit 101 (controller), a read only memory (ROM) 102, a random access memory (RAM) 103, a nonvolatile memory 104, a communication interface (I/F) 105, a control panel 106, an image data bus 110, an image reading unit 111 (reader), an image processing unit 112 (image processor), a page memory 113, an image data transfer control unit 114 (image data transfer controller), an image forming unit 115, a print head 116 (including a plurality of print heads, each corresponding to a color), a displacement sensor 117, a mechanical control driver 118, a temperature sensor 119, and the like.

The ROM 102, the RAM 103, the nonvolatile memory 104, the communication I/F 105, the control panel 106, the image data transfer control unit 114, the displacement sensor 117, the mechanical control driver 118, the temperature sensor 119, and the like are connected to the control unit 101. The control unit 101 includes one or more processors, and the processor is a central processing unit (CPU), a micro processing unit (MPU), a digital signal processor (DSP), or a combination thereof.

The control unit 101 controls operations such as image reading, image processing, and image formation according to various programs stored in at least one of the ROM 102 or the nonvolatile memory 104. The control unit 101 also controls operations such as image data transfer and light emission of the plurality of print heads according to various programs stored in at least one of the ROM 102 or the nonvolatile memory 104. For example, the processor controls light emission of the plurality of print heads based on image data, a color shift correction value, and a displacement correction value according to various programs.

The ROM 102 is a non-transitory computer-readable storage medium functioning as a program memory, which stores various programs.

The RAM 103 functions as a work memory, and temporarily stores a program read from the ROM 102 and temporarily stores data handled by the program.

The nonvolatile memory 104 is a non-transitory computer-readable storage medium, which stores various programs, temporarily stores programs read from the ROM 102, and temporarily stores data handled by the programs.

Further, the nonvolatile memory 104 stores a displacement correction value for correcting a displacement amount of each print head with respect to a regular mounting position. The displacement correction value is a correction value for correcting a displacement amount of an image in the main scanning direction with respect to a sheet. The nonvolatile memory 104 stores a color shift correction value according to the relative displacement of the mounting position of each print head. The color shift correction value is a correction value for correcting a color shift amount of each color to be printed by the plurality of print heads in the main scanning direction.

The communication I/F 105 outputs various information to the outside and inputs various information from the outside. The communication I/F 105 acquires image data.

The control panel 106 includes an input unit such as a touch panel and a display unit such as a display and receives operation inputs from a user and a service person. The control panel 106 is an interface for acquiring a displacement correction value for correcting a displacement amount of an image with respect to a sheet in the main scanning direction.

The control unit 101, the image reading unit 111, the image processing unit 112, and the page memory 113 are connected to the image data bus 110, and the image data bus 110 transfers image data therebetween.

The image reading unit 111 optically reads a document image, acquires image data corresponding to the document image, and outputs the acquired image data to the image processing unit 112.

The image processing unit 112 performs various image processing such as correction on the image data acquired via the communication I/F 105 or the image data acquired by the image reading unit 111.

The page memory 113 includes a page memory 113-Y (Yellow), 180-M (Magenta), 180-C (Cyan), and 180-K (Keyplate). The page memories 113-Y, 180-M, 180-C, and 180-K store the image data of each color processed by the image processing unit 112. The image data transfer control unit 114 is connected to the page memories 113-Y, 180-M, 180-C, and 180-K.

The image data transfer control unit 114 transfers image data of each color output from each of the page memories 113-Y, 180-M, 180-C, and 180-K to the image forming unit 115.

The image forming unit 115 includes a print head 116 or the like, and the print head 116 includes print heads 116-Y, 116-M, 116-C, and 116-K. Image data (Y) output from the page memory 113-Y is transferred to the print head 116-Y, image data (M) output from the page memory 113-M is transferred to the print head 116-M, image data (C) output from the page memory 113-C is transferred to the print head 116-C, and image data (K) output from the page memory 113-K is transferred to the print head 116-K.

For example, the control unit 101 edits image data on the page memories 113-Y, 180-M, 180-C, and 180-K according to a print position. The control unit 101 may edit the image data on the page memories 113-Y, 180-M, 180-C, and 180-K according to the print head.

The image forming unit 115 forms an image based on the image data transferred from the page memories 113-Y, 180-M, 180-C, and 180-K to the print heads 116-Y, 116-M, 116-C, and 116-K. That is, the image forming unit 115 forms an image according to the light emission (state of light emission and extinction) of light emitting elements of the print head 116 based on the image data. In the present embodiment, the image forming unit 115 forms an image corresponding to the light emission of the light emitting elements of the print head 116 based on at least one of the displacement correction value and the color shift correction value, in addition to the image data.

The control unit 101 inputs image data of a test pattern into the page memories 113-Y, 180-M, 180-C, and 180-K, and the image forming unit 115 outputs a test pattern. The displacement sensor 117 detects the test pattern output on the transfer belt 103 and outputs a detected signal to the control unit 101.

The control unit 101 detects the displacement amounts of the print heads 116-Y, 116-M, 116-C, and 116-K with respect to regular mounting positions from the input of the displacement sensor 117. The control unit 101 sets displacement correction values for correcting the displacement amounts of the print heads 116-Y, 116-M, 116-C, and 116-K so that the image of each color in the main scanning direction falls within a range of a valid image area commonly covered by the print heads 116-Y, 116-M, 116-C, and 116-K.

For example, based on the displacement amount of the print head 116-K corresponding to a reference color (K) among the print heads 116-Y, 116-M, 116-C, and 116-K, the control unit 101 sets a displacement correction value for each color so that the image in the main scanning direction falls within the range of the valid image area. A service person or the like visually checks the print result of the test pattern formed on the sheet by the image forming unit 115 and inputs a displacement correction value via the control panel 106. The control panel 106 acquires the input displacement correction value, and the control unit 101 sets the acquired displacement correction value. Alternatively, the control unit 101 changes the displacement correction value acquired by the control panel 106 so that the image of each color in the main scanning direction falls within the range of the valid image area. When the image in the main scanning direction is out of the range of the valid image area, the control unit 101 changes the displacement correction value acquired by the control panel 106 to a predetermined upper limit. The nonvolatile memory 104 and the like store the displacement correction value.

The control unit 101 recognizes a color shift amount, which is a relative displacement amount of each color detected by the displacement sensor 117, and sets a color shift correction value corresponding to the displacement amount. For example, the control unit 101 sets a color shift correction value for correcting the color shift amount on the basis of a color having a largest color shift amount so that the image of each color in the main scanning direction falls within the range of the valid image area commonly covered by the print heads 116-Y, 116-M, 116-C, and 116-K. The control unit 101 controls the light emission of the print heads 116-Y, 116-M, 116-C, and 116-K based on the image data and the color shift correction value. The nonvolatile memory 104 stores the color shift correction value.

The mechanical control driver 118 controls operations of a motor and the like necessary at the time of printing according to instructions from the control unit 101. The control unit 101 outputs a selection signal for selecting one sheet cassette from a plurality of sheet cassettes through the mechanical control driver 118 based on the information on the sheet cassette specified from the control panel 106 and the information on the loaded sheet cassette provided from the mechanical control driver 118. The mechanical control driver 118 selects one sheet cassette from a plurality of sheet cassettes according to the selection signal from the control unit 101.

The temperature sensor 119 detects internal temperature and notifies the control unit 101 of the temperature detection result. The temperature sensor 119 detects an external temperature (environmental temperature) and notifies the control unit 101 of the temperature detection result. For example, the control unit 101 controls the execution of the color shift correction based on the temperature detection result from the temperature sensor 119.

Displacement Correction of Image with respect to Sheet

Next, the displacement correction of an image with respect to a sheet in the main scanning direction will be described.

Figure 2:
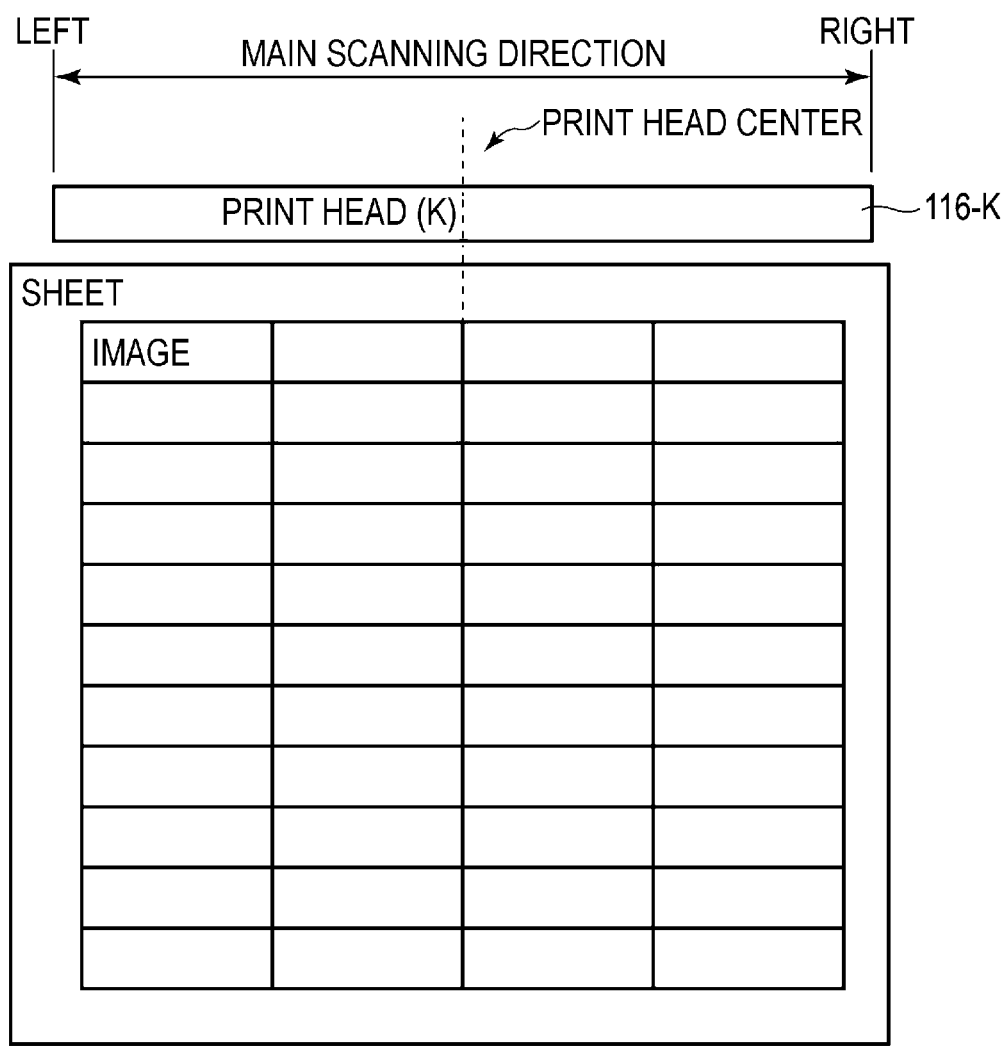
FIG. 2 is a diagram illustrating displacement correction of the image forming apparatus according to the embodiment.

FIG. 2 is a diagram illustrating displacement correction of the image forming apparatus according to the embodiment, and is a diagram illustrating an output example of a test pattern. In FIG. 2, for ease of explanation, among the plurality of print heads, the print head 116-K corresponding to the reference color (K) is illustrated, and illustration of the print heads 116-Y, 116-M, and 116-C corresponding to other colors is omitted.

For example, the print heads 116-Y, 116-M, and 116-K of the image forming apparatus include light emitting elements corresponding to 15,400 pixels. The print heads 116-Y, 116-M, 116-C, and 116-K of the image forming apparatus are arranged in parallel and attached to the housing of a printer by high-precision positioning. However, in actuality, the positions thereof may be slightly displaced. For example, a displacement of several to several tens of pixels may occur.

The control unit 101 instructs displacement correction at a predetermined timing and controls light emission of the print head 116 based on the image data of the test pattern. For example, the control unit 101 periodically instructs displacement correction. Alternatively, the control unit 101 instructs displacement correction according to the elapsed time from previous displacement correction.

The image forming unit 115 outputs a test pattern on the transfer belt 103 based on an instruction for correcting the displacement and emission control of the print head 116 according to the image data of the test pattern. Further, the image forming unit 115 outputs a test pattern on the sheet based on the test pattern output on the transfer belt 103. The displacement sensor 117 detects the test pattern output on the transfer belt 103 and outputs a detected signal to the control unit 101. The control unit 101 detects a valid image area commonly covered by the plurality of print heads based on the detected signal.

For example, a service person or the like determines a displacement correction value for correcting the displacement of an image with respect to a sheet in the main scanning direction while looking at a test pattern on the sheet illustrated in FIG. 2 and inputs the displacement correction value via the control panel 106. The control panel 106 acquires the input displacement correction value and notifies the control unit 101 of the acquired value.

The control unit 101 calculates, for example, a main scanning print position of the reference color (K) based on the displacement correction value acquired via the control panel 106 and determines whether or not the calculated main scanning print position falls within the range of the valid image area. If the control unit 101 determines that the calculated main scanning print position is out of the valid image area, the control unit 101 changes the correction value to the upper limit value so that the calculated main scanning print position falls within the range of the valid image area.

The control unit 101 sets a pixel corresponding to a leftmost light emitting element among the plurality of light emitting elements of the print head 106 as an origin and determines how many light emitting elements of the plurality of light emitting elements correspond to the image in the main scanning direction. That is, the control unit 101 determines which light emitting element of the plurality of light emitting elements corresponds to a left end of the image. The following is an example of main scanning print position calculation when a K color is used as a reference color.

Main scanning print position($K$ color)=((image size of print head 116-$K$)−(maximum sheet size))+2+((reference value128(dot))−displacement correction value of main scanning position between sheet and image)

Main scanning print position($Y$ color)=Main scanning print position($K$ color)+((reference value128(dot))−main scanning color shift correction amount of $Y$ color with respect to $K$ color)

Main scanning print position($M$ color)=Main scanning print position($K$ color)+((reference value128(dot))−main scanning color shift correction amount of $M$ color with respect to $K$ color)

Main scanning print position ($C$ color)=Main scanning print position ($K$ color)+((reference value 128 (dot))−main scanning color shift correction amount of $C$ color with respect to $K$ color)

Figure 3:
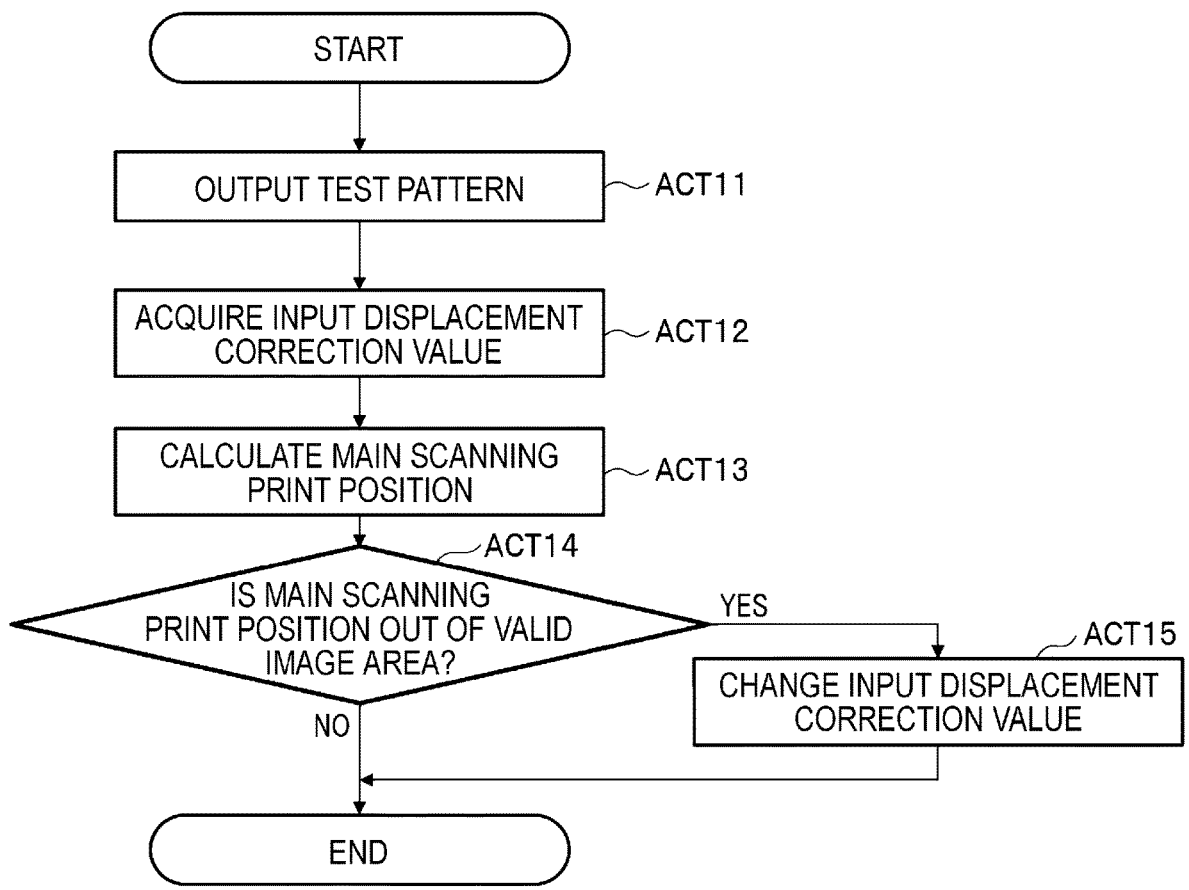
FIG. 3 is a flowchart illustrating an example of the displacement correction according to the embodiment.

FIG. 3 is a flowchart illustrating an example of displacement correction of the image forming apparatus according to the embodiment.

As illustrated in FIG. 3, the control unit 101 instructs displacement correction to occur at a predetermined time and controls light emission of the print head 116 based on the image data of the test pattern. The image forming unit 115 outputs a test pattern based on the instruction for correcting the displacement (ACT 11). That is, the image forming unit 115 outputs a test pattern on the transfer belt 103 based on the light emission control of the print head 116 according to the image data of the test pattern and further forms a test pattern on a sheet based on the test pattern output on the transfer belt 103.

For example, a service person or the like determines a displacement correction value for correcting the displacement of an image with respect to a sheet in the main scanning direction while looking at a test pattern on the sheet and inputs the displacement correction value via the control panel 106. The control panel 106 acquires the input displacement correction value and notifies the control unit 101 thereof (ACT 12).

The control unit 101 calculates, for example, the main scanning print position of the reference color (K) based on the displacement correction value acquired via the control panel 106 (ACT 13). The control unit 101 determines whether or not the calculated main scanning print position falls within the range of the valid image area. If the control unit 101 determines that the calculated main scanning print position is out of the valid image area (ACT 14, YES), the control unit 101 changes the input displacement correction value to the upper limit value so that the calculated main scanning print position falls within the range of the valid image area in the main scanning direction for each color (ACT 15). If the control unit 101 determines that the calculated main scanning print position is not out of the valid image area (ACT 14, NO), the control unit 101 adopts the input displacement correction value.

Color Shift Correction of Each Color

Next, the color shift correction for each color in the main scanning direction will be described.

Figure 4:
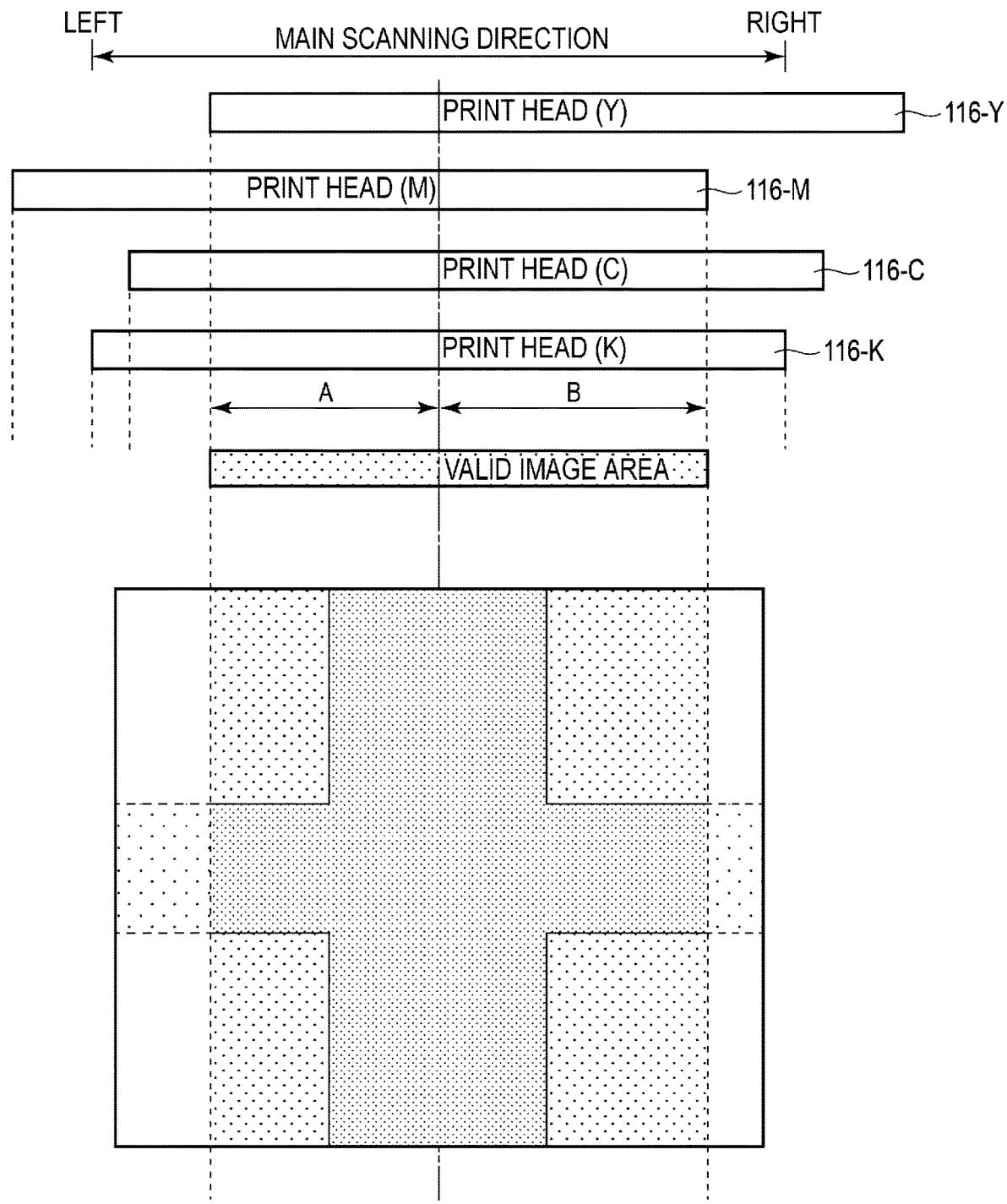
FIG. 4 is a diagram illustrating color shift correction.

FIG. 4 is a diagram illustrating color shift correction of the image forming apparatus according to the embodiment and is a diagram illustrating an output example of a test pattern.

In FIG. 4, the print head 116-Y is displaced to the right in the main scanning direction from a designated center. The print head 116-M is displaced to the left in the main scanning direction from the designated center. The print head 116-C is displaced to the right in the main scanning direction from the designated center. The print head 116-K is displaced to the left in the main scanning direction from the designated center. An area commonly covered by these print heads 116-Y, 116-M, 116-C, and 116-K is the valid image area. With respect to the valid image area, an uncovered area on the left side of the image in the main scanning direction is larger than an uncovered area on the right side (e.g., valid image area A is smaller than valid image area B).

The control unit 101 instructs color shift correction at a predetermined timing and controls light emission of the print head 116 based on the image data of the test pattern. For example, the control unit 101 periodically instructs color shift correction. Alternatively, the control unit 101 instructs color shift correction in accordance with the elapsed time from previous color shift correction. Since the color shift of four colors may occur due to a temperature change such as environmental temperature, in consideration of this point, the control unit 101 may instruct color shift correction when the temperature change amount detected by the temperature sensor 119 exceeds a reference value. The control unit 101 may obtain the temperature change amount by comparing the temperature measured at the time of performing a previous color shift correction with the temperature measured at the time of performing printing, and instruct the color shift correction when the temperature change amount exceeds a reference value.

The image forming unit 115 outputs a test pattern on the transfer belt 103 based on an instruction for correcting the color shift and emission control of the print head 116 according to the image data of the test pattern.

The displacement sensor 117 detects the test pattern output on the transfer belt 103 and outputs a detected signal to the control unit 101. The control unit 101 detects a valid image area commonly covered by the plurality of print heads based on the detected signal.

Further, the control unit 101 calculates and sets a color shift correction value for correcting the color shift amount, for example, on the basis of a color having the largest color shift amount. The control unit 101 calculates the main scanning print position of each color based on the calculated color shift correction value and determines whether or not the calculated main scanning print position of each color falls within the range of the valid image area. If the control unit 101 determines that the calculated main scanning print position of each color is out of the valid image area, the control unit 101 changes the color shift correction value to the upper limit value so that the calculated main scanning print position of each color falls within the range of the valid image area. In addition, the control unit 101 has determined in the displacement correction how many light emitting elements out of the plurality of light emitting elements correspond to the image in the main scanning direction, but in consideration of this determination result, the control unit 101 calculates and sets a color shift correction value so that the calculated main scanning print position of each color falls within the range of the valid image area.

Figure 5:
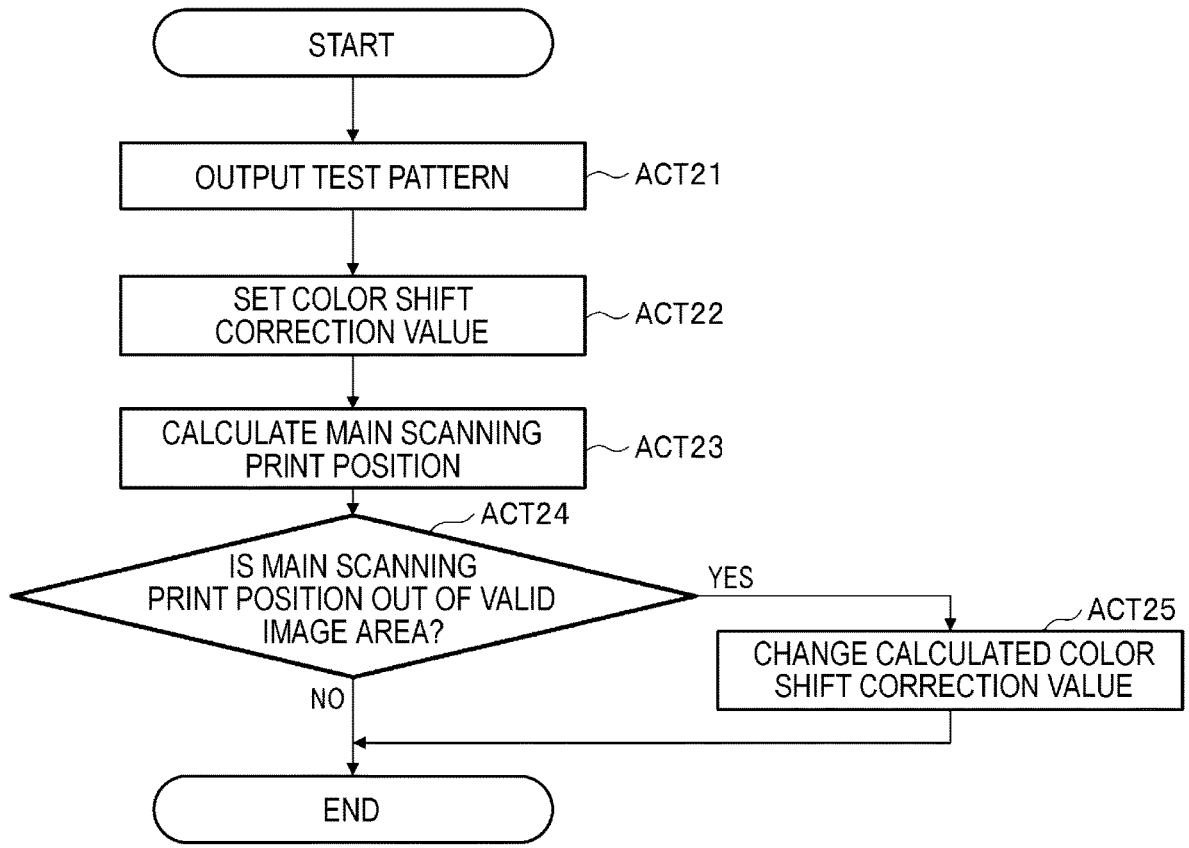
FIG. 5 is a flowchart illustrating an example of the color shift correction according to the embodiment.

FIG. 5 is a flowchart illustrating an example of color shift correction of the image forming apparatus according to the embodiment.

As illustrated in FIG. 5, the control unit 101 instructs color shift correction at the predetermined time and controls light emission of the print head 116 based on the image data of the test pattern. The image forming unit 115 outputs a test pattern based on the instruction for correcting the color shift (ACT 21). That is, the image forming unit 115 outputs a test pattern on the transfer belt 103 based on the light emission control of the print head 116 according to the image data of the test pattern.

The displacement sensor 117 detects the test pattern output on the transfer belt 103. The control unit 101 calculates and sets a color shift correction value for correcting the color shift amount on the basis of the color with the largest color shift amount based on the detection result of the test pattern (ACT 22). The control unit 101 calculates the main scanning print position of each color based on the calculated color shift correction value (ACT 23) and determines whether or not the calculated main scanning print position of each color falls within the range of the valid image area. If the control unit 101 determines that the calculated main scanning print position of each color is out of the valid image area (ACT 24, YES), the control unit 101 changes the color shift correction value to the upper limit value so that the calculated main scanning print position of each color falls within the range of the valid image area (ACT 25). If the control unit 101 determines that the calculated main scanning print position of each color is not out of the valid image area (ACT 24, NO), the control unit 101 employs the set color shift correction value.

In the present embodiment, the displacement correction and the color shift correction have been described, but only one thereof may be executed. The control panel 106 may receive inputs of validity or invalidity of displacement correction and validity or invalidity of color shift correction. When the displacement correction is valid and the color shift correction is valid, the control unit 101 adjusts the displacement correction value and the color shift correction value so that the main scanning print position of each color falls within the valid image area.

The control unit 101 may set the validity or invalidity of the displacement correction according to the sheet size to be printed. For example, the control unit 101 sets the displacement correction to be valid when an image is formed on a sheet having a first size (a size slightly smaller than the length of the print head 116) in the main scanning direction and controls the light emission of the print heads 116-Y, 116-M, 116-C, and 116-K corresponding to each color based on the image data, displacement correction value, and color shift correction value corresponding to the validity setting. The control unit 101 sets the displacement correction to be invalid when an image is formed on a sheet of a second size (a size sufficiently smaller than the length of the print head 116) smaller than the first size in the main scanning direction, the control unit 101 controls the light emission of the print heads 116-Y, 116-M, 116-C, and 116-K corresponding to each color based on the image data and the color shift correction value corresponding to the invalidity setting.

According to the embodiment described above, even if the width of the print head corresponding to each color is not sufficiently long with respect to the sheet width (even if the margin that can be secured is small), it is possible to form an image that is less affected by displacement and less affected by color shift. When the displacement correction is not required, the displacement correction can be set to be invalid, and therefore the image forming time can be shortened. When the color shift correction is not required, the color shift correction can be set to be invalid, and therefore the image forming time can be shortened.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image forming apparatus comprising:
   an image forming unit configured to form an image on a sheet based on image data, the image forming unit comprising a plurality of print heads arranged in parallel;
   each of the plurality of print heads configured to emit light corresponding to a color based on the image data;
   a sensor configured to detect a color shift amount of each color to be formed by the plurality of print heads in a main scanning direction based on a formation result of a test pattern of the image data;
   an interface configured to acquire a displacement correction value for correcting a displacement amount of the image in the main scanning direction with respect to the sheet and to set a validity setting as valid or invalid for displacement correction; and
   a processor configured to:
      set the color shift correction value for correcting the color shift amount so that the image of each color in the main scanning direction falls within a range of a valid image area based on a corresponding color having a largest color shift amount;
      control light emission of the plurality of print heads based on the color shift correction value, the displacement correction value, and the image data;
      set the validity setting to be valid when the image is formed on the sheet of a first size in the main scanning direction; and
      set the validity setting to be invalid when the image is formed on the sheet of a second size smaller than the first size in the main scanning direction.

2. The image forming apparatus according to claim 1, wherein the interface is configured to acquire the displacement correction value based on the formation result of the test pattern of the image data.

3. The image forming apparatus according to claim 1, wherein
   the processor is configured to change the displacement correction value acquired by the interface so that the image of each color in the main scanning direction falls within the range of the valid image area.

4. An image forming method comprising:
   forming, at an image forming unit, an image based on image data based on controlling light emission of a plurality of print heads each corresponding to a color, the print heads being arranged in parallel;
   detecting, at a sensor, a color shift amount of color to be formed by each of the plurality of print heads in a main scanning direction based on a formation result of a test pattern of the image data;
   acquiring, by an interface, a displacement correction value for correcting a displacement amount of the image in the main scanning direction with respect to a sheet;
   setting, by the interface, a validity setting as valid or invalid for displacement correction;
   setting, by the processor, a color shift correction value for correcting the color shift amount on the basis of a color having a largest color shift amount so that an image of each color in the main scanning direction falls within a range of a valid image area commonly covered by the plurality of print heads; and
   controlling, by the processor, light emission of the plurality of print heads based on the color shift correction value, the displacement correction value, and the image data corresponding to the validity setting;
   wherein the validity setting of displacement correction is valid when the image is formed on the sheet of a first size in the main scanning direction, the validity setting of displacement correction is invalid when the image is formed on the sheet of a second size smaller than the first size in the main scanning direction.

5. The method according to claim 4, wherein
   acquiring the displacement correction value comprises determining the displacement correction value based on the formation result of the test pattern of the image data.

6. The method according to claim 4, further comprising
   adjusting, by the processor, the displacement correction value acquired by the interface such that the image of each color in the main scanning direction falls within the range of the valid image area.

7. An image forming apparatus comprising:
   an image forming unit configured to form an image based on image data, the image forming unit comprising a plurality of print heads arranged in parallel;
   each of the plurality of print heads configured to emit light corresponding to a color based on the image data;
   a sensor configured to detect a color shift amount of each color to be formed by the plurality of print heads in a main scanning direction based on a formation result of a test pattern of the image data; and
   an interface configured to acquire a displacement correction value for correcting a displacement amount of the image in the main scanning direction with respect to a sheet,
   a processor configured to:
      change the displacement correction value acquired by the interface to a predetermined upper limit if the image of color in the main scanning direction is not within a range of a valid image area;
      set the color shift correction value for correcting the color shift amount so that the image of each color in the main scanning direction falls within the range of the valid image area based on a corresponding color having a largest color shift amount; and
      control light emission of the plurality of print heads based on the color shift correction value and the displacement correction value and the image data.

8. The image forming apparatus according to claim 7, wherein the interface is configured to acquire the displacement correction value based on the formation result of the test pattern of the image data.

9. The image forming apparatus according to claim 7, wherein the processor is configured to change the displacement correction value acquired by the interface so that the image of each color in the main scanning direction falls within the range of the valid image area.

* * * * *